(12) United States Patent
Roth et al.

(10) Patent No.: US 12,023,591 B2
(45) Date of Patent: Jul. 2, 2024

(54) METHOD AND SYSTEM FOR APPLICATION DEVELOPMENT VIA A GRAPHICAL USER INTERFACE USING AN ENTITY-COMPONENT-SYSTEM ARCHITECTURE

(71) Applicant: Monterey's Coast, Inc., Palo Alto, CA (US)

(72) Inventors: Benjamin Carroll Alcala Roth, Seattle, WA (US); Jesse Kicho Ruder, Seattle, WA (US); Nikhilesh Sigatapu, San Francisco, CA (US); David Anthony Cole, San Jose, CA (US); Charles Duplain Cheever, Palo Alto, CA (US)

(73) Assignee: Monterey's Coast, Inc., Palo Alto, CA (US)

( * ) Notice: Subject to any disclaimer, the term of this patent is extended or adjusted under 35 U.S.C. 154(b) by 151 days.

(21) Appl. No.: 17/673,284

(22) Filed: Feb. 16, 2022

(65) Prior Publication Data

US 2022/0269489 A1 Aug. 25, 2022

Related U.S. Application Data

(60) Provisional application No. 63/152,120, filed on Feb. 22, 2021.

(51) Int. Cl.
*G06F 8/34* (2018.01)
*A63F 13/60* (2014.01)
*G06F 8/20* (2018.01)

(52) U.S. Cl.
CPC ............ *A63F 13/60* (2014.09); *G06F 8/20* (2013.01); *G06F 8/34* (2013.01); *A63F 2300/6009* (2013.01)

(58) Field of Classification Search
CPC . G06F 8/34; G06F 8/20; G06F 40/186; G06F 16/951; G06F 9/5077; G06F 3/002;
(Continued)

(56) References Cited

U.S. PATENT DOCUMENTS

2011/0173587 A1 7/2011 Detwiller
2013/0346883 A1* 12/2013 Shuster ............... H04L 67/131
715/757
(Continued)

OTHER PUBLICATIONS

Cao, Zhu-hua, CN 111813445 (translation), Oct. 23, 2020, 6 pgs <CN_111813445.pdf>.*
(Continued)

*Primary Examiner* — Tuan A Vu
(74) *Attorney, Agent, or Firm* — MOSER TABOADA

(57) ABSTRACT

Systems and methods for application development via a graphical user interface (GUI) using an Entity-Component-System (ECS) architecture are provided herein. In some embodiments, a method for application development may include receiving a selection of at least one actor to be part of a game scene; displaying a representation of the at least one actor in the game scene; receiving a selection of one or more behaviors to associate with each of the at least one actors in the game scene; storing the selected one or more behaviors as associations with each of the at least one actors, wherein the associations are stored in a hash table; updating, each of that at least one actors and their associated behaviors; and automatically creating an executable video game based on the at least one actor and associated behaviors in an ECS architecture without the need for user written software code.

20 Claims, 6 Drawing Sheets

(58) Field of Classification Search
CPC .... H04L 67/131; H04L 63/1433; A63F 13/60; A63F 13/77; A63F 2300/6009
See application file for complete search history.

(56) References Cited

U.S. PATENT DOCUMENTS

| | | | |
|---|---|---|---|
| 2016/0306785 A1* | 10/2016 | Sebastian | G06F 40/186 |
| 2018/0330756 A1* | 11/2018 | MacDonald | G06F 16/951 |
| 2019/0377672 A1* | 12/2019 | Ante | A63F 13/77 |
| 2020/0201679 A1* | 6/2020 | Wentz | H04L 63/1433 |
| 2020/0269131 A1* | 8/2020 | Pereira | G06F 9/5077 |
| 2020/0278924 A1 | 9/2020 | Ante et al. | |
| 2020/0327739 A1* | 10/2020 | Soon-Shiong | G06F 3/002 |

OTHER PUBLICATIONS

Chen et al, CN 104536734, (translation), Jan. 2, 2018, 10 pgs <CN_104536734.pdf >.*

International Search Report & Written Opinion mailed May 13, 2022 for Application No. PCT/US2022/016712, 11 pages.

\* cited by examiner

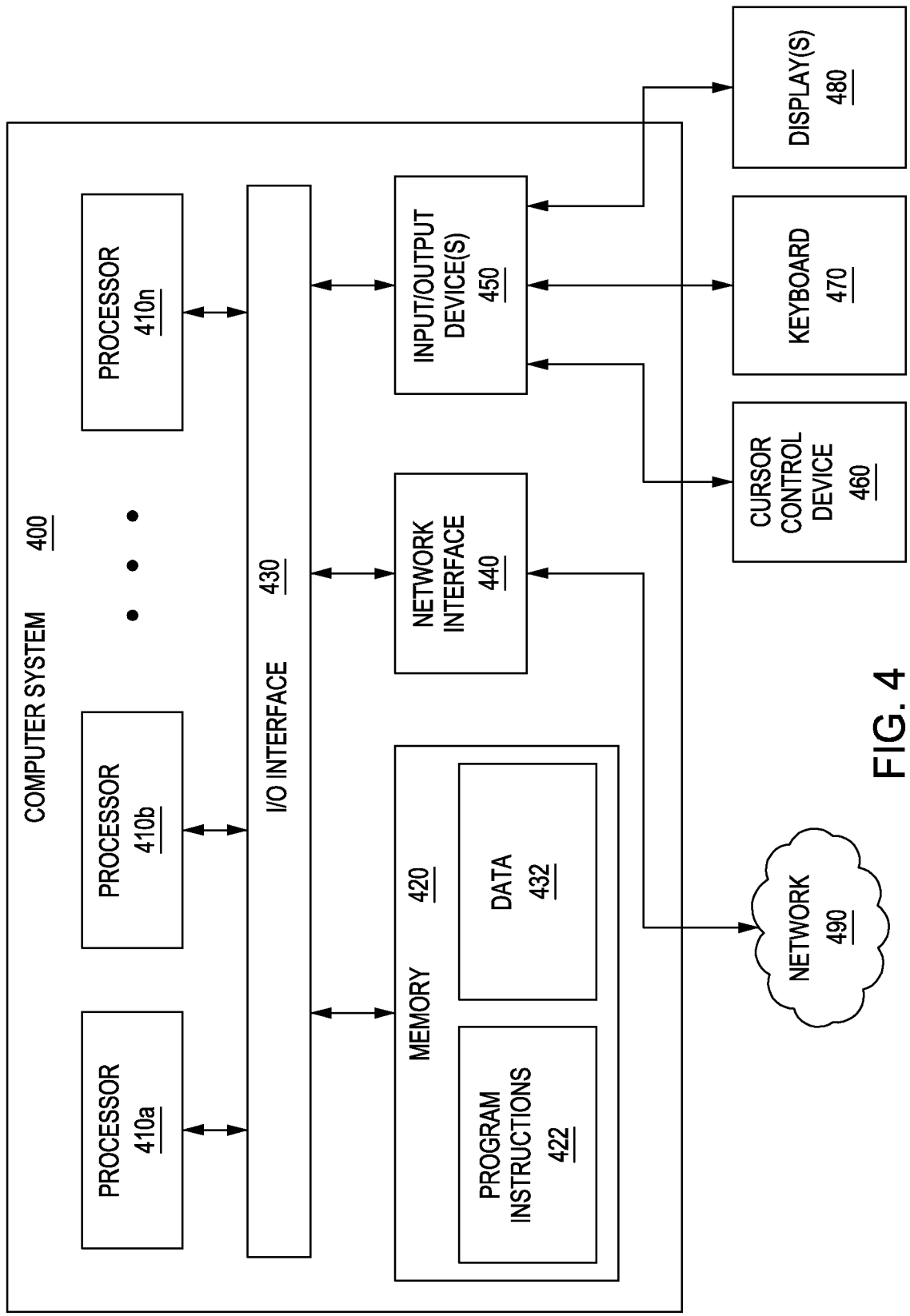

METHOD AND SYSTEM FOR APPLICATION DEVELOPMENT VIA A GRAPHICAL USER INTERFACE USING AN ENTITY-COMPONENT-SYSTEM ARCHITECTURE

CROSS-REFERENCE

This application claims benefit of U.S. Provisional Patent Application No. 63/152,120 filed Feb. 22, 2021, which is hereby incorporated in its entirety.

BACKGROUND

Field

Embodiments of the present invention generally relate to application development and more specifically, to a method and system for video game development via a graphical user interface using an Entity-Component-System (ECS) architecture.

Description of the Related Art

The popularity and widespread use of video games has increased dramatically in recent years. Just as there are more people playing video games, there are more people creating video games, and there is an increased need for modern development tools to support the creation of new games.

Increasingly, people play video games on mobile devices, such as iOS and Android phones. As people spend more time on their mobile devices, they spend less time on traditional desktop computers and laptops. However, even though many games are played on mobile devices, there are historically limited ways to create games using a mobile device. Therefore, there is a need for modern game development tools to work on mobile devices.

A common architecture that is used for the development of video games is an entity-component-system architecture. Each entity, component, and system has a distinct role. One system performs actions on entities possessing a component of that particular system. An entity-component-system architecture may be advantageous because it provides an efficient and intuitive model for defining and organizing video game objects. In contrast, some game development tools use object-oriented architectures, which include class inheritance. However, in many cases, class inheritance is ill-suited to describe video game environments because the inheritance tree becomes too complex. In these circumstances, where objects may mix and match a wide variety of different traits, an entity-component-system architecture is advantageous.

Most game development tools require coding by the developer. Requiring software coding to enable game creation excludes the novice would-be game developer with no coding skills from participating in the video game development arena. Furthermore, game development tools traditionally run on desktop computers because most mobile devices are not well suited for writing code, due in part to their lack of physical keyboard, lack of administrative access to execute programs, and lack of access to the filesystem. One way to facilitate game development without encountering these issues is to provide a graphical user interface instead of requiring code. However, game development tools that include a graphical user interface traditionally expose an object-oriented architecture, rather than an ECS architecture, leading to the pitfalls described above.

Therefore, there is a need for a method and system for video game development via a graphical user interface using an Entity-Component-System (ECS) architecture.

SUMMARY

Systems and methods for application development via a graphical user interface (GUI) using an Entity-Component-System (ECS) architecture are provided herein. In some embodiments, a method for application development via a GUI using an ECS architecture may include receiving, via a GUI, a selection of at least one actor to be part of a game scene; displaying a representation of the at least one actor in the game scene; receiving, via the GUI, a selection of one or more behaviors to associate with each of the at least one actors in the game scene; storing the selected one or more behaviors as associations with each of the at least one actors, wherein the associations are stored in a hash table; updating, via one or more handlers, each of that at least one actors and their associated behaviors; and automatically creating an executable video game based on the at least one actor and associated behaviors in an ECS architecture without the need for user written software code.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 2A-2F depict a graphical user interface for video game development using an Entity-Component-System (ECS) architecture, according to one or more embodiments of the invention;

FIG. 4 depicts an exemplary system that may be used for video game development via a graphical user interface using an Entity-Component-System (ECS) architecture, according to one or more embodiments of the invention.

Figure 1:
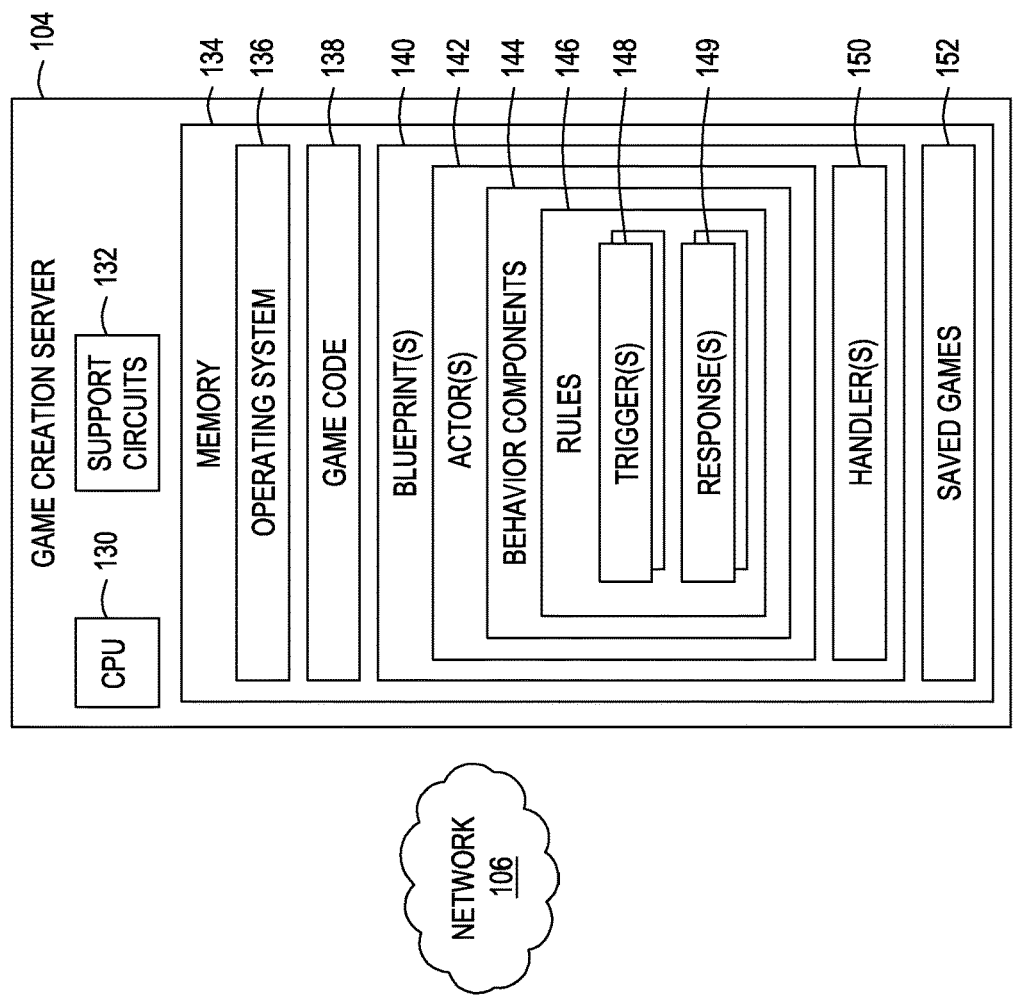
FIG. 1 depicts a block diagram of a video game development system using an Entity-Component-System (ECS) architecture, according to one or more embodiments of the invention.
Figure 1:
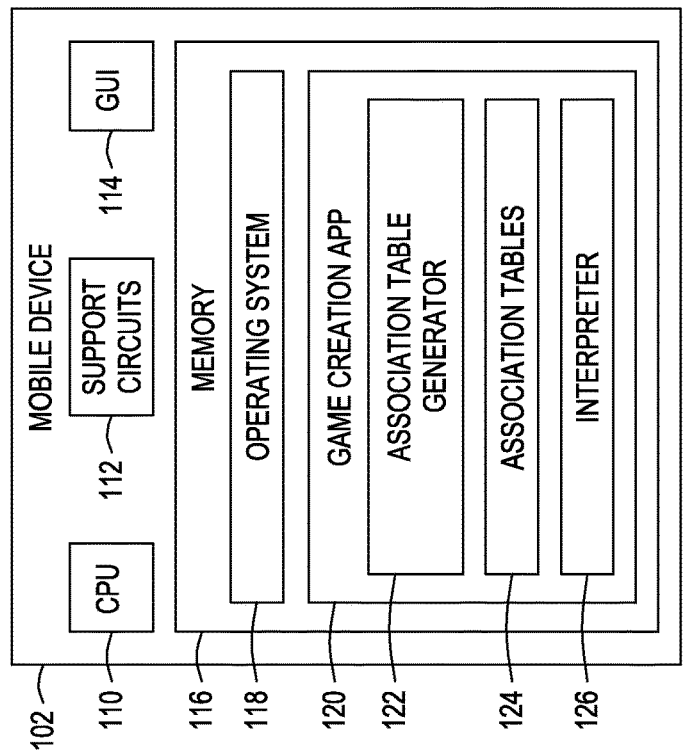

While the method and system are described herein by way of example for several embodiments and illustrative drawings, those skilled in the art will recognize that the method and system for video game development via a graphical user interface using an Entity-Component-System (ECS) architecture is not limited to the embodiments or drawings described. It should be understood that the drawings and detailed description thereto are not intended to limit embodiments to the particular form disclosed. Rather, the intention is to cover all modifications, equivalents and alternatives falling within the spirit and scope of the method and system for video game development via a graphical user interface using an Entity-Component-System (ECS) architecture defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the invention provide a system and method for video game development via a graphical user interface (GUI) using an Entity-Component-System (ECS) architecture, according to one or more embodiments. ECS architectures are different than Object Oriented Programming (OOP) architectures. Where OOP has Classes and Objects and complex inheritance structures, an ECS architecture has Entities, Components and Systems that don't use such complex inheritance structures.

An ECS architecture is so named because Entities are the fundamental conceptual building block of the system, with each entity representing a different concrete in-game object. For every discernible "thing" in your game-world, you have one Entity. Entities have no data and no methods. In high level terms, Components label the Entity as possessing a particular aspect or characteristic. Meanwhile, each System runs continuously (as though each System had its own private thread/handler) and performs global actions on every Entity that possesses a Component of the same aspect as that System.

Since Components are simple data buckets, they have no dependencies. Each system will typically register the Components an Entity must have for the System to operate on it. For example, a render system might register the model, transform, and drawable components. It will then check each entity for those components, and if the Entity has them all the System will perform its logic on that entity. If not, the Entity is simply skipped, with no need for complex dependency trees.

The ECS architecture uses composition, rather than inheritance trees as used in OOP. An entity will be typically made up of an ID and a list of components that are attached to it. Any type of game object can be created by adding the correct components to an entity. This can also allow the developer to easily add features of one type of object to another, without any dependency issues. For example, a player entity could have a "hammer" component added to it, and then it would meet the requirements to be manipulated by some "hammerHandler" system, which could result in that player doing damage to things by hitting them.

Furthermore, ECS architecture applications provide major performance and efficiency advantages over traditional OOP applications, by more efficiently leveraging the CPU instruction and data caches. The Objects in OOP applications tend to be connected by many indirect references, specifically references between objects themselves, and also all of the virtual table lookups incurred when methods are called on objects. OO objects are also allocated as necessary and spread all over the memory space. This random distribution of necessary data across memory causes the CPU to behave inefficiently as it constantly waits for memory accesses.

In embodiments consistent with the present disclosure, an interactive game experience in an ECS architecture environment takes place in what is referred to as a scene. One or more scenes describe a world in which the interactive experience takes place. The scenes may be played or edited. When a scene is played, the user experiences the interactive world as it was designed by the creator. When a scene is edited, the creator interacts with a GUI to edit the contents of the scene. Each piece of content in a scene is referred to as an actor. As used herein, an actor is an Entity in the ECS architecture described above. When an actor is selected by the creator via the GUI, it is placed in the scene. When the actor is placed in the scene, an association between the scene and the actor is created. There are different systems that affect the actors in the scene, referred to as behaviors. As used herein, behaviors are systems and the associations between the actor and the behaviors are referred to as Components in the ECS architecture described above. Behaviors may include physical traits (e.g., possessing a body with position, rotation, width and height); interactive controls (e.g., following the user's touch on their mobile device screen when dragged); physics-based behaviors (e.g., responding to the force of gravity); association of metadata (e.g., containing identifying tags); and the like. When behaviors are selected for an actor, an association is stored between the actor and the behavior, said association stored as a component. As the creator adds, changes, or deletes actors in the scene as well as define behaviors for said actors, the components are updated. Pre-built code is used by the game engine, such that when the creator plays the scene, the game engine interprets the association tables of that scene, making all of the actors selected for the scene perform based on the associated behaviors, thereby creating a video game in an ECS architecture without the need to write software code or use complex inheritance structures.

In other words, scenes are comprised purely of data. The game engine includes pre-built code, such that when game creators provide the data of the scenes in the form of association tables, the pre-built code that is part of the existing game engine interprets the data to render a scene.

Various embodiments of a system and method for video game development via a graphical user interface using an Entity-Component-System (ECS) architecture are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. The present disclosure is presents exemplary embodiments in terms of video game creation; however, those skilled in the art will understand the claimed subject matter may be utilized for building any application.

Some portions of the detailed description that follow are presented in terms of algorithms or symbolic representations of operations on digital signals stored within a memory of a specific apparatus or special purpose computing device or platform. In the context of this specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device can manipulate or transforming signals, typically represented as physical electronic or magnetic quantities within memories, registers, or other information storage devices, transmission devices, or display devices of the special purpose computer or similar special purpose electronic computing device.

FIG. 1 is block diagram of a system 100 for a for video game development via a graphical user interface (GUI) using an Entity-Component-System (ECS) architecture, according to one or more embodiments of the invention. The system 100 includes a mobile device 102 and a game creation server 104, communicatively connected via network 106. The mobile device 102 may comprise a Central Processing Unit (CPU) 110, support circuits 112, a GUI 114, and a memory 116. The CPU 110 may comprise one or more commercially available microprocessors or microcontrollers that facilitate data processing and storage. The various support circuits 112 facilitate the operation of the CPU 110 and include one or more clock circuits, power supplies, cache, input/output device and circuits, and the like. The memory 116 comprises at least one of Read Only Memory (ROM), Random Access Memory (RAM), disk drive storage, optical storage, removable storage and/or the like. In some embodiments, the memory 116 comprises an operating system 118 and a game creation application 120. The game creation application 120 may be downloaded from an e-commerce mobile application store (not shown), for example, the APPLE® App Store or the GOOGLE® Play Store. The game creation application 120 includes an association table generator 122 for storing associations selected by a creator via the GUI 114 during game creation. The game creation application 120 also includes a plurality of association tables 124 for holding the associations between actors and behaviors, lastly includes an interpreter 126 for interpreting said association tables 124 during game play.

The operating system (OS) 118 generally manages various computer resources (e.g., network resources, file processors, and/or the like). The operating system 118 is configured to execute operations on one or more hardware and/or software modules, such as Network Interface Cards (NICs), hard disks, virtualization layers, firewalls and/or the like. Examples of the operating system 118 may include, but are not limited to, various versions of IOS, ANDROID, and the like.

The game creation server 104 is a computing device, for example, a desktop computer, laptop, tablet computer, and the like, or it may be a cloud based server (e.g., a blade server, virtual machine, and the like). One example of a suitable computer is shown in FIG. 4, which will be described in detail below. According to some embodiments, the game creation server 104 includes a Central Processing Unit (CPU) 130, support circuits 132, and a memory 134. The CPU 130 may include one or more commercially available microprocessors or microcontrollers that facilitate data processing and storage. The various support circuits 132 facilitate the operation of the CPU 130 and include one or more clock circuits, power supplies, cache, input/output circuits, and the like. The memory 134 includes at least one of Read Only Memory (ROM), Random Access Memory (RAM), disk drive storage, optical storage, removable storage and/or the like. The memory 134 includes an operating system 136, a database of compiled code 138, and blueprints 140. Blueprints 140 include one or more actors 142 for the game creator to select from. Each of the one or more actors 142 may be associated with one or more behavior components 144. Each of the one or more behavior components 144 may be associated with one or more rules 146, while each of the one or more rules 146 may contain one or more triggers 148 and responses 149. A plurality of handlers 150 are implemented for the one or more behavior components 144. Created games are stored as saved games 152.

An object in the scene is referred to as an actor 142. The creator adds actors 142 to the scene from their mobile device 102 by revealing a menu in the GUI 114. When an actor 142 is added to a scene, the association table generator 122 stores the association between the scene and the actor 142 in one or more association tables 124. In some embodiments, the Lua scripting language is utilized and the association tables 124 are of a Lua data type: table. The association tables 124 or other data structure holds the associations that will be interpreted by the game engine to render the scene. The association tables 124 allow for common behaviors among actors without using inheritance. In addition to storing the association when an actor is added to the scene, the GUI 114 displays a representation of the actor 142 that has been added to the scene. The creator may select one or more actors 142 in the scene by tapping the representation of the actor 142 in the scene's GUI 114. Actors 142 are composed of one or more behavior components 144. When an actor 142 contains a behavior 144, the effects of that behavior are applied to that specific actor 142. Actors 142 may contain behavior components 144 at the initial moment the creator adds them to the scene. For example, an actor 142, upon creation may contain a behavior 144 for "Body", and have a default position in the physical space of the scene. When a behavior 144 is selected (or pre-defined at the initial moment when the actor 142 is added to the scene), the behavior 144 is stored as an association with the actor 142. Different behavior components 144 contain actor-specific data about how the actors 142 should behave. For example, two different actors 142 may each contain a component for the Body and therefore each have a position in the scene space, but the two actors 142 may have different positions from one another. Two actors 142 may each contain a behavior 144 for the Gravity behavior and therefore both respond to the force of gravity, but the force of gravity on each respective actor 142 may be of a different magnitude. The actor-specific data fields for a particular behavior 144 are referred to as its properties, and the values of these properties are referred to as property values.

Behavior components 144 may be enabled or disabled. A disabled behavior 144 remains part of the actor 142 (i.e., remains associated with the actor 142 in the association table 124, and retains its property values, but the effects of that behavior 144 are not applied by the behavior until the behavior 144 is enabled. Behavior components 144 are enabled by default. Upon selecting one or more actors 142 in the scene GUI 114, the creator is presented with a summary of all the behavior components 144 contained by the selected actor(s) 142, including the specific properties and property values of each behavior 144, and whether each behavior 144 is enabled. In some embodiments, the GUI 114 consists of a drawer element that contains a scrollable list of behavior components 144. The creator may modify the behavior components 144 for a selected actor(s) 142 in the GUI 114. For example, the creator may add or remove behavior components 144 to the selected actor(s) 142 using a menu which lists all available behaviors components 144. The creator may then configure behavior components 144 contained by the selected actor(s) 142; e.g., they could change property values, such as a gravity constant of the Gravity behavior, or a position of the Body behavior. The creator may also enable or disable the behavior 144. In some embodiment, the creator may modify each property value with a number input or a text input GUI element, and the user may enable or disable the behavior 144 with a switch GUI element.

Behavior components 144 may be modified in response to events while the scene is played. The system that defines how behavior components 144 change at play time is a particular behavior referred to as a Rules behavior 146. A Rules behavior 146 may consist of zero or more Rules. If a currently selected actor 142 contains the Rules behavior 146, a list of Rules for that actor 142 is shown in the GUI 114. The creator may activate a GUI 114 control to add new Rule to an actor 142 or remove existing Rules from an actor 142.

Each Rule contains one or more triggers 148, which define the events that cause the Rule to run; and one or more responses 149, which define the set of actions to be taken when the Rule is run. The creator may change a Rule's trigger 148 in the GUI 114 by opening a menu to view a list of possible triggers 148, and selecting one such trigger 148. The creator may add or remove responses 149 in the GUI 114, and configure a particular response 149 by opening a menu containing a list of all possible responses 149, and selecting one such response 149. Triggers 148 may consist of a variety of events, including input events (e.g., the user taps on this actor 142); physical events (the actor's Body collided with another actor's Body); state events (the scene started to play, or a behavior property changed its value); and the like.

Responses 149 modify the contents of the scene, including the property values of a behavior 144 of an actor 142 and whether the behavior 144 is enabled. For example, the creator may change the gravitational constant of an actor's Gravity behavior 144. Responses 149 may also add or remove one or more actors 142 from the scene, or change the scene state (for example by restarting the scene, navigating to a different scene), and the like. Responses 149 may also indirectly cause further triggers 148 to fire. For example, a response 149 may move an actor 142 into another actor 142 in the physical scene space, and either actor 142 may further contain a trigger 148 that fires when the two actors 142 collide. The effect of a response 149 may optionally depend on the prior state of the scene; for example, a response 149 may modify a behavior property by a value of 1, relative to its previous value. Therefore, the exact outcome of the given response depends on the prior value of that behavior property.

Triggers 148 and responses 149 may each contain parameters. For example, the trigger 148 "When this actor collides with another actor" contains a parameter to specify which subset of other actors 142 should qualify for this trigger when collided. The response 149 "Create an actor" contains a parameter specifying what kind of actor to create. The creator may access a GUI 114 input to modify the value of each Rule parameter. The list of possible triggers 148 and responses 149 for an actor 142 is derived from the behavior components 144 contained by that actor 142. For example, the trigger 148 "When this actor is dragged" is defined by the Drag behavior, and is only available to actors that contain a behavior 144 for the Drag behavior.

Each component behavior 144, trigger 148, and response 149 is different. For example, the Body behavior gives actors 142 a physical presence in scene space; the Movement behavior gives an actor 142 the ability to move in the scene space; the gravity behavior causes actors 142 to fall; the drawing behavior allows actors 142 to display unique artwork in the scene. However, all behavior components 144 follow a common protocol to manage their respective components when the scene is played.

When a scene is played, each behavior 144 associated with an actor 142 implements generic handlers 150 for different pre-defined moments in the scene. Examples of handlers 150 include passing a frame of time, drawing to the screen of the device, enabling or disabling a specific component behavior 144, and the like. Each time a handler 150 is run, the behavior has an opportunity to take action or perform a side-effect based on the entire set of that behavior's components present among all actors 142 in the scene. Therefore, a single behavior is able to continually manage all actors 142 that contain that behaviors components. Behaviors also define all possible triggers 148 and responses 149 that could be applied to Rules for actors 142 that contain this behavior. When a behavior defines a Rule trigger 148, that behavior is responsible for detecting events for that trigger 148 at play time, and firing the trigger 148 in order to run its responses 149. Further, behaviors define handlers 150 that are executed by the Rules engine for a given response 149 and component when that Rule is triggered. For example, the Movement behavior may define a Rule response 149 "Move this Actor toward another actor" with a handler 150 that defines how to move the given actor 142 toward another actor 142. Behaviors also define whether they depend on other behaviors. For example, an actor 142 cannot have a component for "Moving" without also having a component for "Body", because having a physical position in scene space (a Body) is a prerequisite to being able to change that position (Moving). The GUI 114 for adding behaviors prevents the user from adding any behaviors to an actor 142 that lacks their prerequisite behaviors.

Different behaviors contain different properties, and different Rule triggers 148 and responses 149 contain different parameters. In order to render a generic GUI 114 to allow the user to configure the values of behavior properties, each property contains a property spec. The property spec defines what type of value is expected (e.g., a number, a string, an enumeration), any constraints on that value (e.g., a maximum or a minimum value), and any other GUI-related metadata (e.g., a human-readable label or description of that property). For example, the Body behavior has a property called Density, which is used to calculate the mass of the Body when performing physics-related calculations in the scene. The property spec for Density indicates that Density must be a number, and that it must be greater than or equal to 0.1. Similarly, Rule triggers 148 and responses 149 contain a parameter spec for each possible parameter. Rule parameter specs follow the same base schema as behavior property specs. The GUI 114 responds to the metadata contained in a particular property spec or parameter spec. For example, a property whose property spec specifies a number displays a GUI element consisting of a numeric input, whereas a property whose property spec specifies a string would show a GUI element consisting of a text input. A property whose property spec specifies a richer value type, such as an actor 142, shows a specialized GUI element for selecting that type of value, in this case a list of available actors 142. Further, the spec's constraints are enforced in the GUI 114. For example, if the spec contains a maximum value, the creator is prevented from providing a larger value than the maximum in the GUI 114. When the scene is played, as previously described, Rule responses 149 may directly or indirectly change the value of different behavior properties. When such a change occurs during play time, the property spec is reviewed to ensure that the constraints of the spec are respected. For example, if a Rule response 149 causes a body Density of an actor 142 to drop from 1 to −1, the body Density of the actor 142 is set to a value of 0.1 because the density property spec indicates a minimum value of 0.1. Further, behavior property specs indicate whether they are readable and writeable by Rules. For a Rule to change the value of a behavior property while the scene is played, the spec for that behavior property must indicate that the property may be written. For a Rule to read the value of a behavior property while the scene is played (e.g., to assign its value to a different property), the spec for that behavior property must indicate that the property can be read.

Figures 2A, 2B:
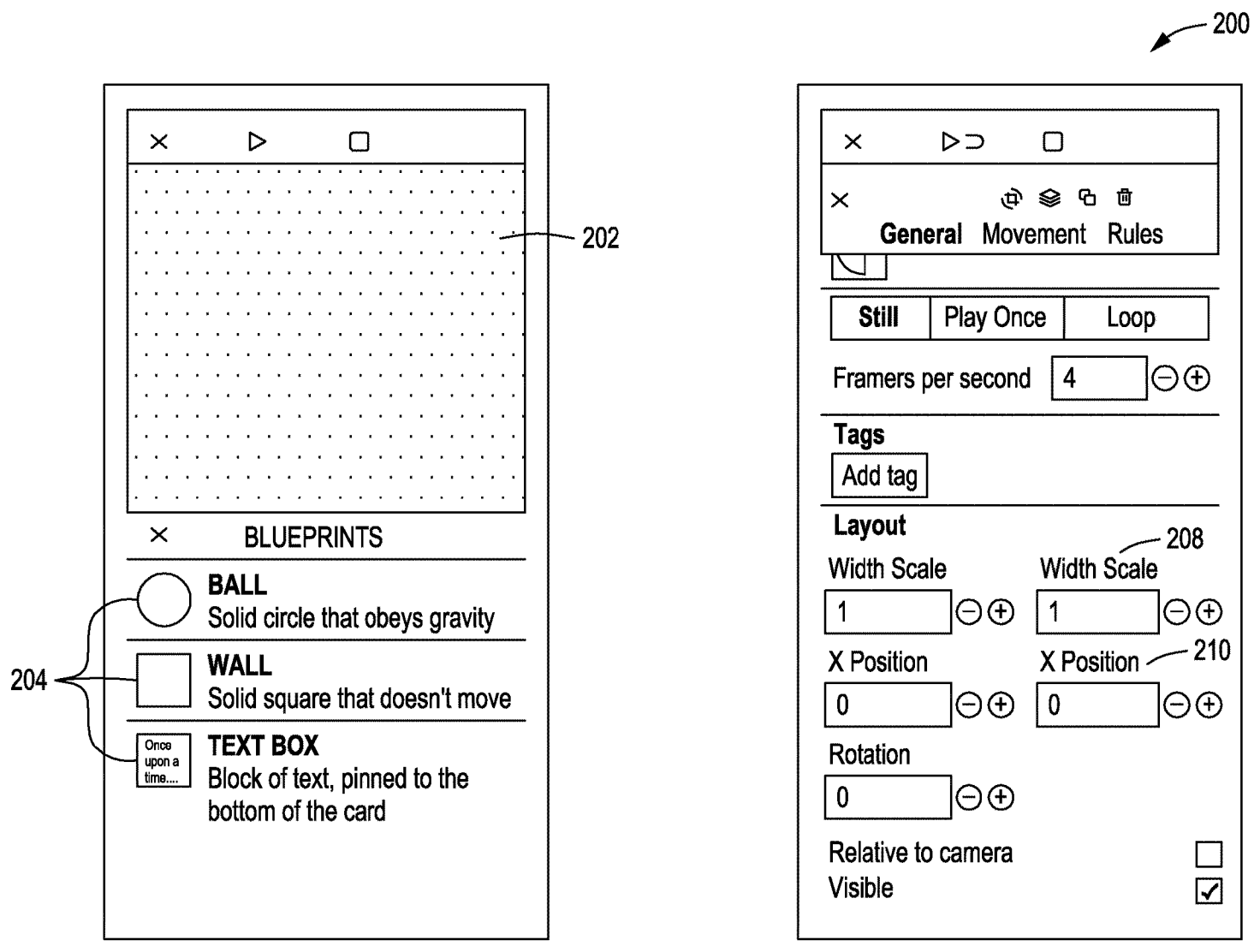
Figure 2C:
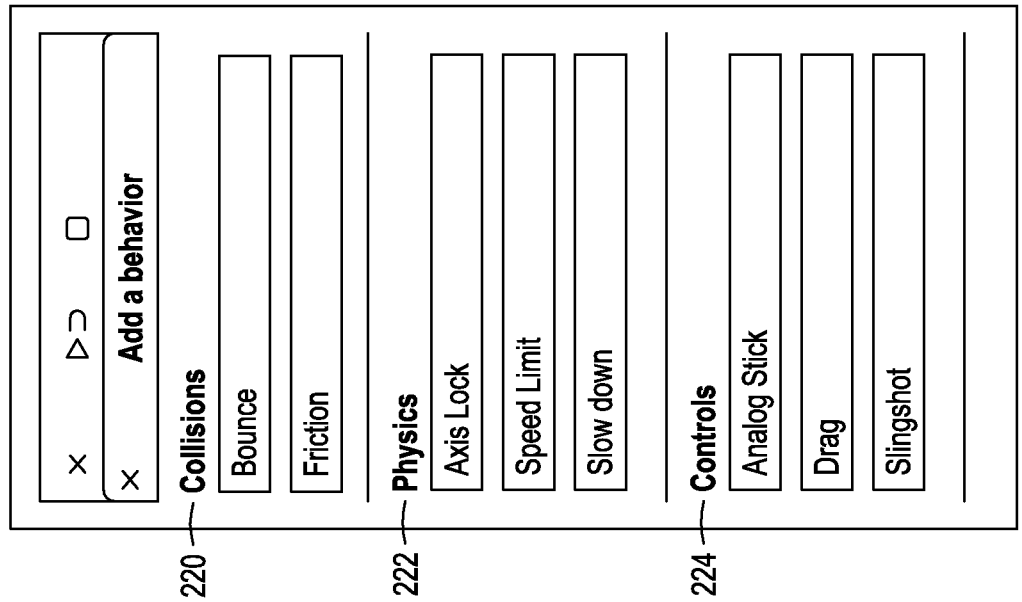

FIGS. 2A-2F depict the graphical user interface 200 used for creating a video game using an Entity-Component-System (ECS) architecture. FIG. 2A depicts a new game screen 202. Any one of the actors 204 may be selected. A selection of the ball places a solid circle on the game screen 202. A selection of the wall places a solid rectangle on the game screen 202. A selection of the text box places a block of text on the game screen.

The FIG. 2B depicts the GUI for selecting general attributes for the ball, including a size with respect to width and height scale 208, a starting position 210 per x and y coordinate positions, and the like. Still, Play Once, and Loop are properties of the Drawing behaviors that may be used to animate an entity. Relative to camera identifies whether the actor lives in a camera-coordinated-space or a scene-coordinate space. Tags are a behavior, typically used for referring to actors inside of Rules. For example, Move toward the actor with the tag "target". The size and starting location are stored for the ball.

FIG. 2C depicts the GUI the Movement screen for adding movement-related behaviors to the ball. Generally, this screen shows a list of which movement-related behaviors the actors currently possesses. Within the motion screen 212, a creator may select whether their ball remails still, moves at a constant rate, or moves dynamically (i.e., is moved by other forces, such as bumping into other actors). As each behavior is selected, each is stored as an association between the ball and the behavior. The creator may then select the "Add physics or controls" field 218.

Figure 2D:
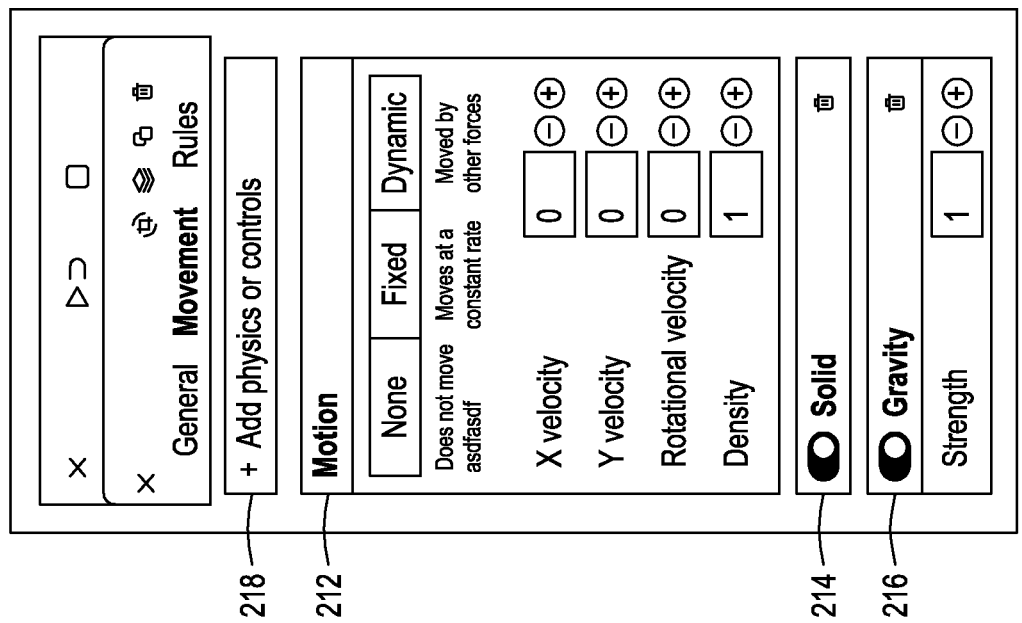
Figure 2E:
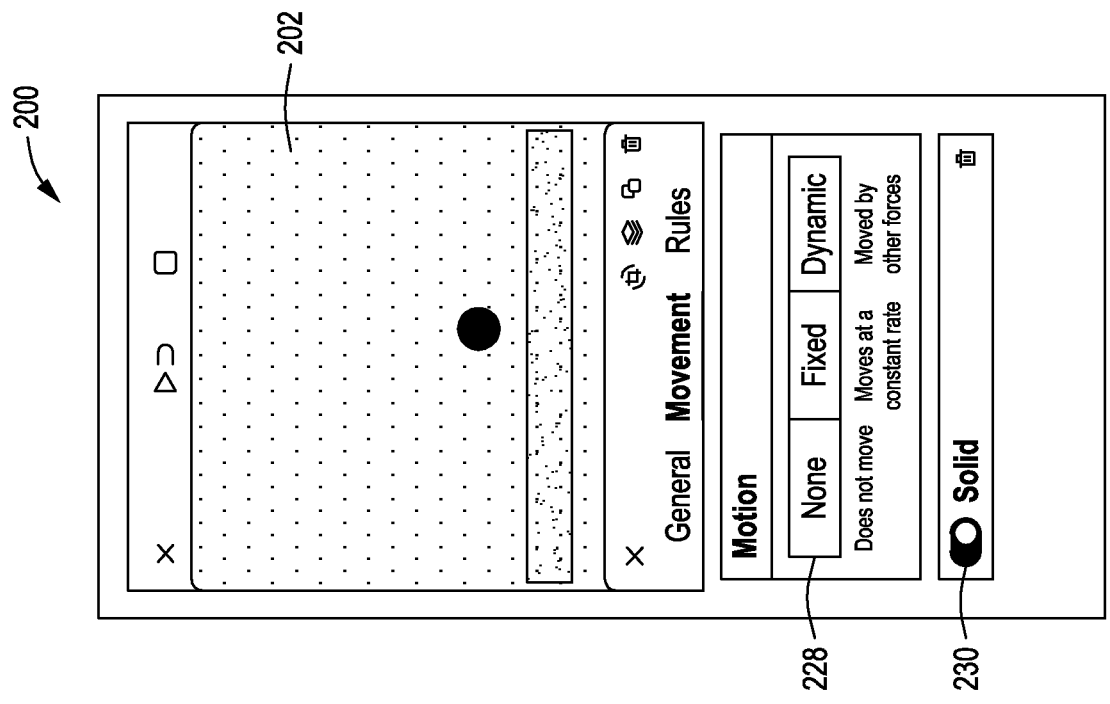

FIG. 2D depicts the design options available under the "Add physics or controls" menu. The creator may select types of collisions 220 the ball experiences with other actors in the scene, behaviors associated with physics 222, and other controls 224, such as an analog stick, drag, or slingshot. As behaviors are selected, the may be stored as associations between the ball and the behavior, or additional menus are displayed via the GUI to refine the selected behavior. FIG. 2E depicts options available when the analog stick toggle switch 226 is selected. A user may further select a turn friction, axes affected, and a speed for the ball.

Figure 2F:
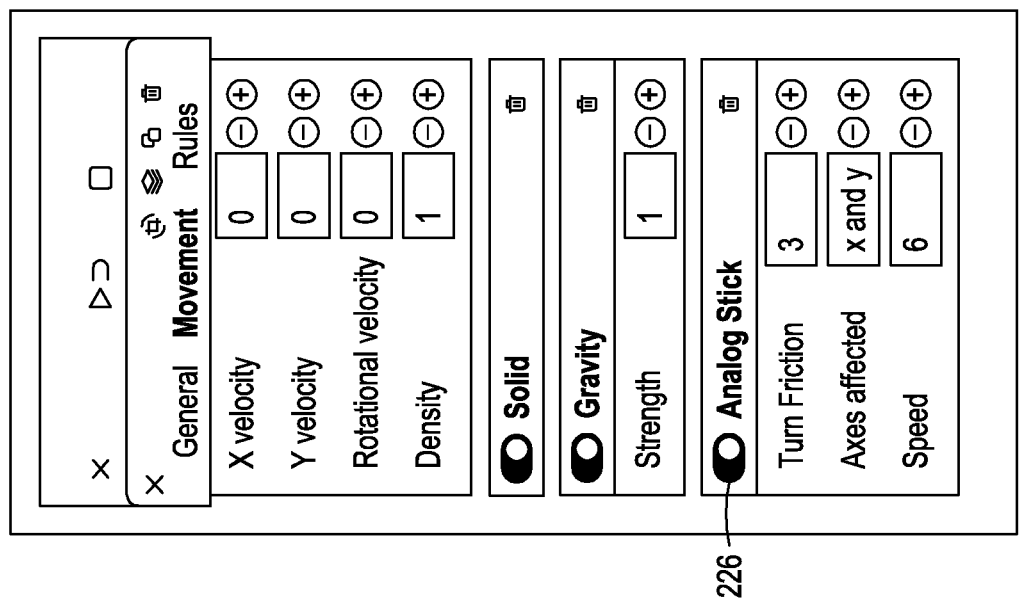

FIG. 2F depicts the game screen 202 when a wall is selected to be placed on the game screen 202 with the ball. The wall has two behaviors. With respect to motion, the option "none" 228 is selected and the toggle switch 230 is selected to make the wall solid. Associations between the wall and the motion and solid behaviors are stored.

The behaviors are stored in a hash table; however, a visual representation is depicted in the Table 1.

TABLE 1

| Entity (Actor) | System (Behavior) | | | | | |
| --- | --- | --- | --- | --- | --- | --- |
| | Body | Solid | Artwork | Motion | Gravity | Analog Stick |
| Wall | X | X | X | | | |
| Ball | X | X | X | X | X | X |

In some embodiments, the tables are stored as hash tables. As the creator adds actors and behaviors to the game, the associations are stored in a data file that represents the table of associations. This is a simple example; however, extremely elaborate games may be designed by simply selecting actors and behaviors via the GUI. Although an X depicts a simple behavior, each X had many different properties attached to it. The association tables are ultimately interpreted by the game engine to render a scene.

Figure 3:
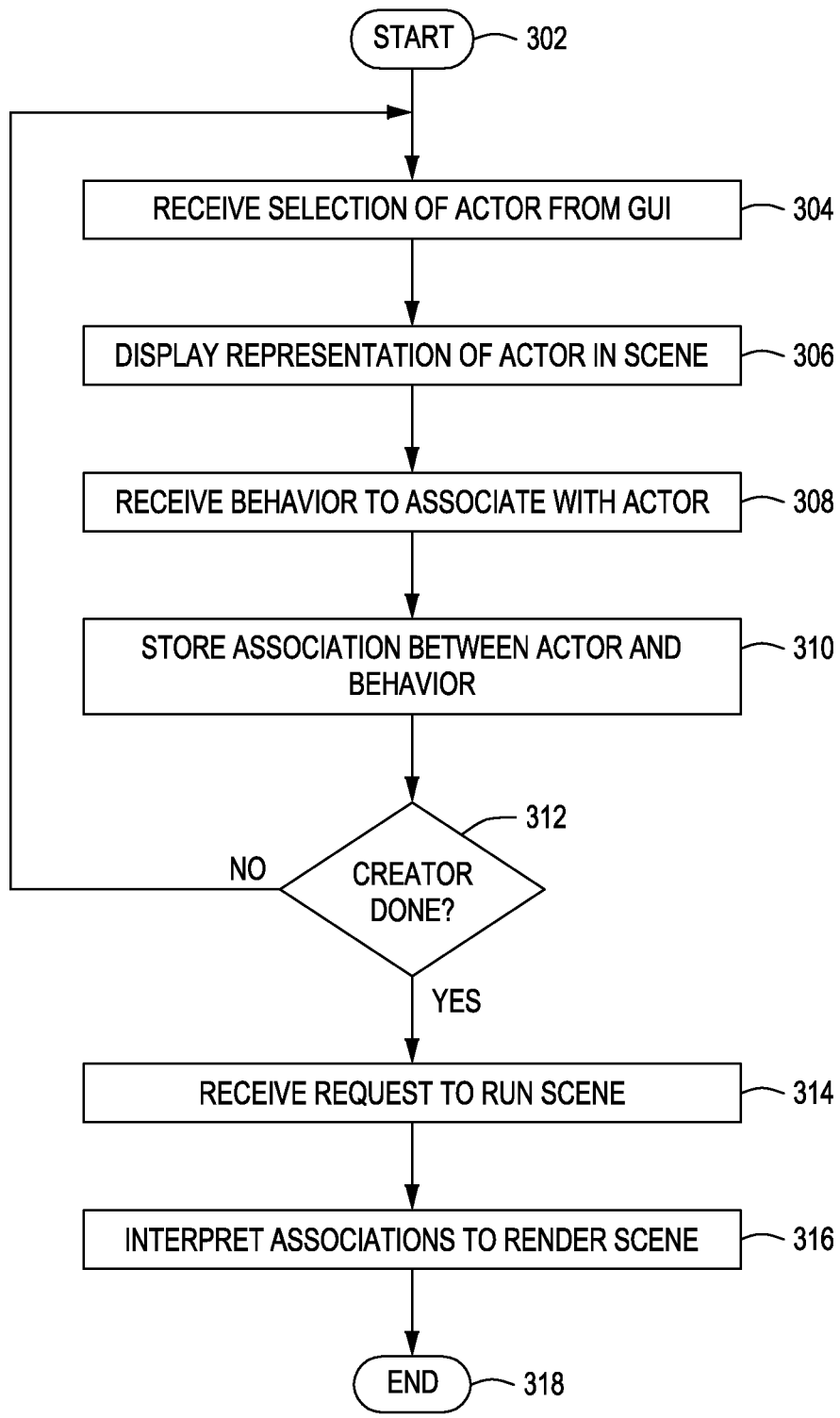
FIG. 3 depicts a flow diagram of a method for video game development via a graphical user interface using an Entity-Component-System (ECS) architecture, according to one or more embodiments of the invention.

FIG. 3 depicts a flow diagram of a method 300 for video game development via a graphical user interface (GUI) using an Entity-Component-System (ECS) architecture, according to one or more embodiments of the invention. The method 300 starts at 302 and proceeds to 304.

At 304, input is received from GUI on the mobile device. A user selects an actor to add to a scene, where a scene is the displayed space in which the actors will interact. The user adds actors to the scene from their mobile device via a menu in the GUI. When the input is received, the method 300 proceeds to 306.

At 306, a representation of the actor is added to the displayed scene. The user may select the actor for the scene by tapping their representation in the scene's GUI.

At 308, one or more behaviors is received. When an actor includes a behavior, the effects of that behavior are applied to the actor. Actors may contain behaviors at the initial moment the user adds them to the scene. For example, an actor may include a component of Body and have a default position in the physical space of the scene. Other behaviors may be added, such as responding to a force of gravity, or having a specific location as a starting position in the scene space.

At 310, the received behavior is stored as an association with the actor.

At 312, it is determined whether the creator is done adding actors to the scene. If it is determined that the creator is not done adding actors to the scene, then the method 312 proceeds to 304, where the method iterates until at 312 it is determined that the creator is done adding actors to the scene and the method 300 proceeds to 314.

At 314, a request is received to run the scene. When the creator has selected all actors and behaviors for a scene, the creator may select a run button from the GUI.

At 316, the game engine interprets the association tables to render the scene. The game experience is played based on the creator's stored associations between actors and their behaviors. The entire game creation and execution is performed completely through a GUI without the creator writing any code. The method 300 ends at 318.

FIG. 4 depicts a computer system 400 that can be utilized in various embodiments of the present invention to implement the computer and/or the display, according to one or more embodiments.

Various embodiments of system and method for video game development via a graphical user interface (GUI) using an Entity-Component-System (ECS) architecture, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement the method 300 as processor-executable program instructions 422 (e.g., program instructions executable by processor(s) 410) in various embodiments.

In the illustrated embodiment, computer system 400 includes one or more processors 410a-410n coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment, some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments, processors 410 may be general-purpose or embedded processors implementing any of a variety of instruction set architectures (ISAs). In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example, via telecommunications/telephony networks such as analog voice networks or digital fiber communications networks; via storage area networks such as Fiber Channel SANs; or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the operations and methods described above, such as the operations described with respect to FIG. 2 and FIG. 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined.

The invention claimed is:

1. A method for application development via a graphical user interface (GUI) using an Entity-Component-System (ECS) architecture, comprising:
   receiving, via a GUI, a selection of at least one actor to be part of a game scene, wherein each actor is an entity of the ECS architecture;
   displaying in the GUI a representation of the at least one actor in the game scene;
   receiving, via the GUI, a selection of one or more behaviors to associate with each of the at least one actors in the game scene, wherein each behavior is a system of the ECS architecture;
   storing the associations between the one or more selected behaviors and each of the at least one selected actors in a corresponding table, wherein the associations are stored as components of the ECS architecture;
   receiving, via the GUI, a selection of at least one of rules, triggers, or responses associated with the selected one or more behaviors, wherein the one or more behaviors define handlers for different pre-defined moments in the game scene, and wherein each handler is configured, during execution of the game, to update each of the at least one actors and their associated behaviors based on the at least one of rules, triggers, or responses; and
   automatically creating an executable video game based on the at least one actor and associated behaviors, handlers, and at least one of rules, triggers, or responses in an ECS architecture without the need for user written software code.

2. The method of claim 1, the method further comprising:
   receiving, via the GUI, a request to run the scene; and
   interpreting the associations in the table to render the scene.

3. The method of claim 2, wherein the associations are interpreted using pre-built code of a game engine.

4. The method of claim 3, wherein the game engine is a Lua game engine.

5. The method of claim 1, wherein the executable video game created in an ECS architecture does not use object oriented programming inheritance structures.

6. The method of claim 1, wherein the scene is a displayed space in which the actors will interact.

7. The method of claim 1, wherein actors are added to the scene from a mobile device via a menu in the GUI.

8. The method of claim 1, wherein the actor is selected for the scene by selecting the actor's representation in the GUI.

9. The method of claim 1, wherein the one or more behaviors applied to an actor include at least one of a component of body having a default position in a physical space of the scene, a response to a force of gravity, or having a specific location as a starting position in the scene space.

10. Apparatus for application development via a graphical user interface (GUI) using an Entity-Component-System (ECS) architecture, comprising at least one processor coupled to at least one non-transitory computer readable medium having instructions stored thereon, which, when executed by the at least one processor, cause the at least one processor to perform operations comprising:
   receiving, via the GUI, a selection of at least one actor to be part of a game scene, wherein each actor is an entity of the ECS architecture;
   displaying in the GUI a representation of the at least one actor in the game scene;

receiving, via the GUI, a selection of one or more behaviors to associate with each of the at least one actors in the game scene, wherein each behavior is a system of the ECS architecture;

storing the associations between the one or more selected behaviors and each of the at least one selected actors in a corresponding table, wherein the associations are stored as components of the ECS architecture;

receiving, via the GUI, a selection of at least one of rules, triggers, or responses associated with the selected one or more behaviors, wherein the one or more behaviors define handlers for different pre-defined moments in the game scene, and wherein each handler is configured, during execution of the game, to update each of the at least one actors and their associated behaviors based on the at least one of rules, triggers, or responses; and automatically creating an executable video game based on the at least one actor and associated behaviors, handlers, and at least one of rules, triggers, or responses in an ECS architecture without the need for user written software code.

11. The apparatus of claim 10, the operations performed further comprising:

receiving, via the GUI, a request to run the scene; and interpreting the associations in the table to render the scene.

12. The apparatus of claim 11, wherein the associations are interpreted using pre-built code of a game engine.

13. The apparatus of claim 12, wherein the game engine is a Lua game engine.

14. The apparatus of claim 10, wherein the executable video game created in an ECS architecture does not use object oriented programming inheritance structures.

15. The apparatus of claim 10, wherein the scene is a displayed space in which the actors will interact.

16. The apparatus of claim 10, wherein actors are added to the scene from a mobile device via a menu in the GUI.

17. The apparatus of claim 10, wherein the actor is selected for the scene by selecting the actor's representation in the GUI.

18. The apparatus of claim 10, wherein the one or more behaviors applied to an actor include at least one of a component of body having a default position in a physical space of the scene, a response to a force of gravity, or having a specific location as a starting position in the scene space.

19. A non-transitory computer readable medium having instructions stored thereon, which, when executed by at least one processor, cause the at least one processor to perform a method for application development via a graphical user interface (GUI) using an Entity-Component-System (ECS) architecture, the method comprising:

receiving, via the GUI, a selection of at least one actor to be part of a game scene, wherein each actor is an entity of the ECS architecture;

displaying in the GUI a representation of the at least one actor in the game scene;

receiving a selection of one or more behaviors to associate with each of the at least one actors in the game scene, wherein each behavior is a system of the ECS architecture;

storing the associations between the one or more selected behaviors and each of the at least one selected actors in a corresponding table, wherein the associations are stored as components of the ECS architecture;

receiving, via the GUI, a selection of at least one of rules, triggers, or responses associated with the selected one or more behaviors, wherein the one or more behaviors define handlers for different pre-defined moments in the game scene, and wherein each handler is configured, during execution of the game, to update each of the at least one actors and their associated behaviors based on the at least one of rules, triggers, or responses; and automatically creating an executable video game based on the at least one actor and associated behaviors, handlers, and at least one of rules, triggers, or responses in an ECS architecture without the need for user written software code.

20. The non-transitory computer readable medium of claim 19, wherein the method further comprises:

receiving a request to run the scene; and interpreting the associations in the table to render the scene.

* * * * *